United States Patent [19]

Berit

[11] 4,162,980

[45] Jul. 31, 1979

[54] LOAD INDICATOR FOR CENTRIFUGES

[75] Inventor: Bradley I. Berit, New Paltz, N.Y.

[73] Assignee: The De Laval Separator Company, Poughkeepsie, N.Y.

[21] Appl. No.: 912,026

[22] Filed: Jun. 2, 1978

[51] Int. Cl.$^2$ .............................................. B01D 33/10

[52] U.S. Cl. .............................................. 210/360 R

[58] Field of Search ..................... 210/85, 86, 97, 104, 210/360 R, 360 A; 73/290 R; 116/115, 124 A

[56] References Cited

U.S. PATENT DOCUMENTS

| | | | |
|---|---|---|---|
| 3,044,625 | 7/1962 | Smith et al. | 210/86 |
| 3,141,846 | 7/1964 | Laven | 210/86 |
| 3,446,431 | 5/1969 | Marchal et al. | 210/86 |
| 3,559,808 | 2/1971 | O'Conor et al. | 210/86 |

*Primary Examiner*—Frank Sever
*Attorney, Agent, or Firm*—Cyrus S. Hapgood

[57] ABSTRACT

A basket centrifuge is provided with a load indicator comprising a vertical shaft rotatable in a sleeve secured to and extending through a stationary frame cover overlying the basket, a paddle on the lower end of the shaft being adapted to ride on the inner wall of the annular mass of material in the rotating basket and thus rotate the shaft to operate the mechanism for indicating the radial thickness of this mass. Sealing means surround the shaft in sealing engagement therewith below the sleeve, and releasable means clamp the sealing means in sealing engagement with the lower end of the sleeve. The releasable means preferably include spring clamps having lower portions on which the sealing means are seated and upper portions secured to the sleeve.

8 Claims, 1 Drawing Figure

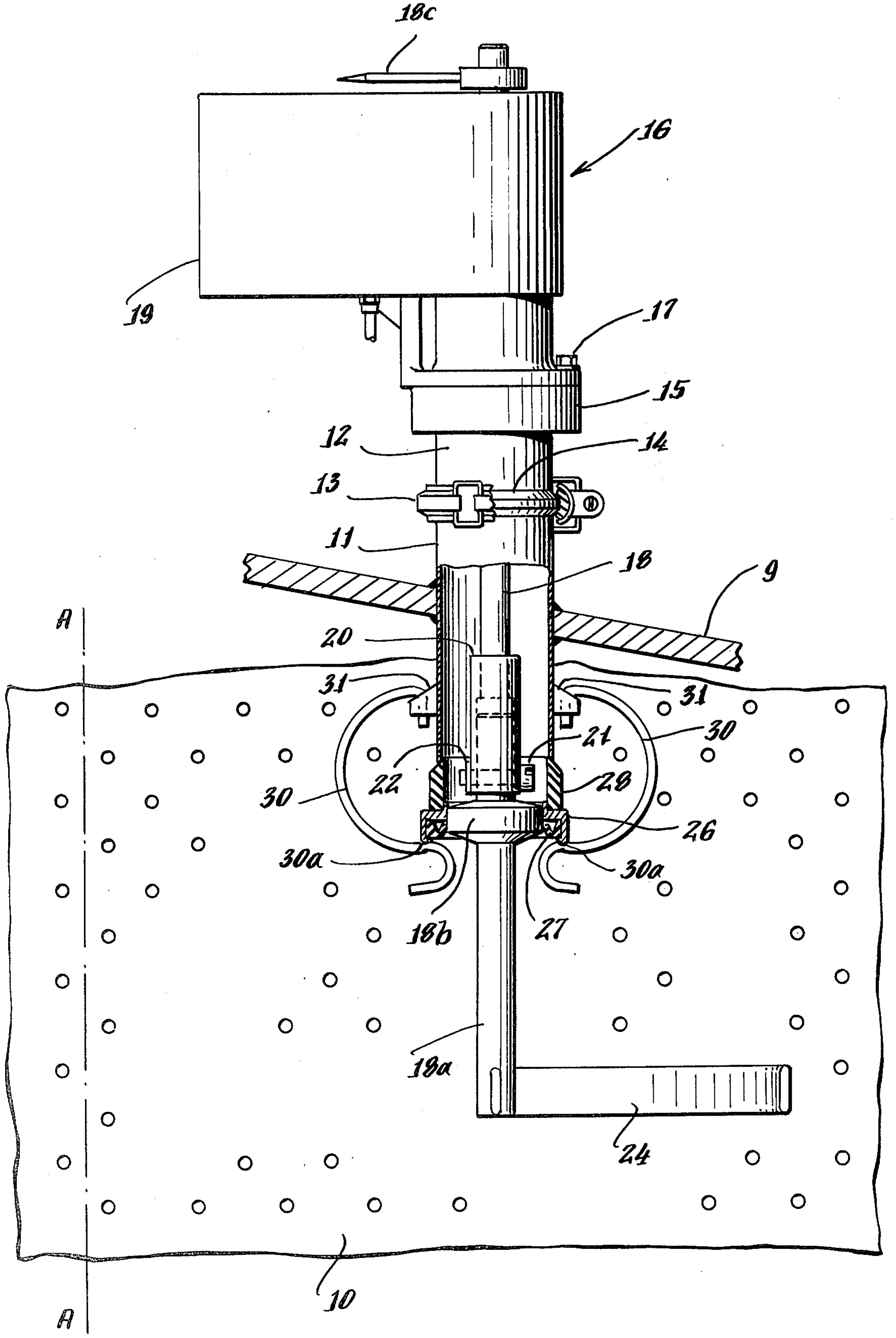
18c
16
19
17
15
12
14
13
11
18
9
A
20
31
31
21
30
22
28
30
26
30a
30a
18b
27
18a
24
10
A

LOAD INDICATOR FOR CENTRIFUGES

This invention relates to centrifuges of the rotary basket type having means for indicating, during the centrifuging operation, the extent to which the basket is loaded with material being centrifuged.

Load indicators for basket centrifuges, as commonly made, include a vertical shaft extending through a stationary sleeve in the cover of the stationary frame and provided at its lower end with a paddle adapted to ride on the inner surface of the annular mass of material being centrifuged in the basket. The paddle is displaced inwardly toward the rotation axis of the basket as the thickness of this annular mass (i.e., the load) increases, and the paddle moves outwardly as the thickness decreases, these movements of the paddle causing the shaft to rotate in one direction or the other. The upper end of the paddle shaft is connected to a pointer which indicates the position of the paddle and thus the extent to which the basket is loaded.

It is desirable to provide means for sealing the interior of the basket from the interior of the stationary sleeve through which the paddle shaft extends. However, such sealing means cannot be entirely satisfactory unless its parts can be readily cleaned and inspected.

An object of the present invention is to provide sealing means for the load indicator which can be readily disassembled for cleaning and inspection.

A centrifuge made according to the invention comprises sealing means surrounding the paddle shaft in sealing engagement therewith below the stationary sleeve, and releasable means clamping the sealing means in sealing engagement with the lower end of the sleeve. Preferably, the releasable means are spring clips having upper portions secured to the sleeve and having lower portions engaging the sealing means.

In a preferred embodiment of the invention, the sealing means include a substantially rigid annular member having a depending flange, a first sealing ring compressed between this flange and the paddle shaft, and a second sealing ring compressed between the annular member and the lower end of the stationary sleeve. Also in this embodiment, the lower portions of the spring clips releasably engage the bottom of said depending flange. Thus, by disengaging the clips from the flange, the parts of the sealing means can be lowered from the sleeve and separated from each other for inspection and cleaning.

For a better understanding of the invention, reference may be had to the accompanying drawing in which the single illustration is an elevational view, partly in section, of a preferred form of the new load indicator, with parts of the rotary basket and frame cover broken away.

Referring to the drawing, the basket centrifuge comprises a hollow cylindrical frame (not shown) having a top cover 9 releasably secured to the frame. Mounted for rotation within the stationary frame is a perforated basket, part of which is shown at 10. Basket 10 is adapted to be rotated by any suitable means (not shown) about a vertical axis A—A coinciding with the axis of the cylindrical frame. The frame cover 9 slopes downwardly from its center located on the vertical axis A—A.

A sleeve 11 extends vertically through a hole in frame cover 9, to which the sleeve is welded. Above sleeve 11 is a similar sleeve 12, the two sleeves being interconnected by a releasable clamp 13. As shown, clamp 13 is a conventional dairy clamp coacting with outwardly extending flanges 14 on the adjacent ends of the sleeves. A pad 15 is welded to the top of sleeve 12.

A load indicator mechanism, shown generally at 16, rests upon pad 15 and is secured thereto by bolts, one of which is shown at 17. Indicator mechanism 16 includes a vertical shaft 18 rotatably mounted in stationary housing 19 and extending downwardly into the lower portion of sleeve 11. A downward extension **18*a* of shaft 18 is releasably connected thereto by suitable means. As shown, the releasable connecting means include a sleeve 20 secured to shaft 18, a pin 21 extending transversely through sleeve 20 and through a part of shaft 18*a* within this sleeve, and a releasable clip 22** holding the pin against removal from its connecting position.

The lower end of indicator shaft **18–18*a* is provided with a paddle 24 which extends laterally in an arc from the shaft. The convex surface of the outer part of the paddle is adapted to ride on the inner wall of the annular mass of material being centrifuged in the basket. As the thickness and thus the volume of this rotating annular mass increases, during feeding of the material into the basket, paddle 24 is displaced inwardly by the mass toward the axis A—A, thereby rotating shaft 18–18*a* in one direction. Conversely, as the thickness of the rotating annular mass decreases, during discharge of centrifuged solids from the basket, paddle 24 swings outwardly so as to rotate shaft 18–18*a* in the opposite direction. The shaft is biased by suitable means (not shown) in the direction to maintain paddle 24** in contact with the inner wall of the rotating mass of material as this wall recedes radially outward during discharge of solids.

As is conventional, the mixture of liquid and solids to be centrifuged is introduced into the rotating basket 10 by way of a feed pipe (not shown) extending downwardly through an opening in frame cover 9. Under the action of centrifugal force, the solids are compacted against the perforated cylindrical wall of the basket while the liquid passes through the basket perforations into the annular space between the basket and the surrounding wall of the stationary frame, from which the liquid is discharged as as effluent. When the solids have accumulated to a sufficient volume in the basket, a scraper (not shown) within the basket is swung outwardly against the rotating annular mass of solids so as to plow solids from the mass, the solids thus removed from the basket wall being discharged by gravity through the bottom of the basket. When sufficient solids have been discharged, the scraper is retracted to its initial position where it cannot interfere with centrifuging of additional mixture fed into the basket. Such scrapers and their operating means are well known in the art.

According to the present invention, means are provided for sealing the interior of basket 10 from the interior of sleeve 11. As shown, this sealing is accomplished by means including a substantial rigid annular member 26 surrounding an enlargement **18*b* of the indicator shaft, a first sealing ring 27 compressed between a depending flange 26*a* of member 26 and the periphery of enlargement 18*b*, and a second sealing ring 28 compressed between the upper surface of member 26 and the lower end of the sleeve 11. As shown, sealing ring 27 is a so-called lip seal which is U-shaped in cross-section, and sealing ring 28 is a collar having a bevelled upper end which fits partly into the bottom of sleeve 11**.

The assembly 26-27-28 is held in sealing position by releasable means comprising a pair of diametrically opposed spring clamps 30. Each of these clamps has an upper end portion extending downwardly through a hole in a lug 31 welded to sleeve 11. From lug 31, the clamp curves outwardly and then inwardly to its lower end portion having in its upper surface a recess 30*a* in which flange 26*a* is seated. The spring action of clamps 30 urges the sealing means against the bottom of sleeve 11.

The sealing means 26-27-28 are easily disassembled by pulling the lower end portions of clamps 30 downwardly and away from each other, whereby the sealing means can be slipped down the shaft 18*a* and off the end of paddle 24 for cleaning. Clip 22 and pin 21 can then be removed to disengage shaft section 18*a* from section 18, after which the indicator mechanism 16 can be removed by releasing the clamp 13.

As shown in the drawing, indicator shaft 18–18*a* is provided at its upper end with a pointer 18*c* coacting with a scale (not shown) on housing 19 to indicate the volume of the load in the rotating basket.

I claim:

1. In combination with a centrifugal basket mounted for rotation about a vertical axis and adapted to receive a mixture of liquid and solids to be centrifuged, and a stationary frame cover overlying the basket, a load indicator comprising a sleeve extending through a hole in said cover and secured thereto, a generally vertical shaft mounted for rotation in the sleeve and projecting through the lower end thereof into the basket, a paddle secured to the lower portion of said shaft and engageable with the inner surface of an annular mass of solids being centrifuged in the basket, indicating means overlying said cover and including mechanism operable by the paddle through said shaft to indicate changes in the position of said inner surface relative to said axis, sealing means surrounding the shaft in sealing engagement therewith below said sleeve, and releasable means clamping said sealing means in sealing engagement with the lower end of said sleeve, said releasable means including spring clips having upper portions secured to said sleeve and having lower portions engaging said sealing means.

2. The combination of claim 1, in which said sealing means include a substantially rigid annular member having a depending flange, a first sealing ring compressed between said flange and shaft, and a second sealing ring compressed between said annular member and the lower end of said sleeve.

3. The combination of claim 2, in which said spring clips have their said lower portions engaging said annular member.

4. The combination of claim 2, in whch said spring clips have their said lower portions engaging said depending flange at the lower portion thereof.

5. The combination of claim 2, in which said spring clips have their said lower portions provided with recesses in which said flange is seated.

6. The combination of claim 1, in which said upper portions of the clips are releasably secured to the sleeve.

7. The combination of claim 1, comprising also releasable means securing said indicating means to said sleeve.

8. The combination of claim 1, in which said shaft includes upper and lower sections, and releasable means holding said sections together and located between the sealing means and said cover.

* * * * *